United States Patent [19]

Lee et al.

[11] Patent Number: 5,223,466
[45] Date of Patent: Jun. 29, 1993

[54] OLEFIN POLYMERIZATION AND COPOLYMERIZATION CATALYST

[75] Inventors: Sam S. Lee, Hoffman Estates; Nicholas M. Karayannis, Naperville, both of Ill.

[73] Assignee: Amoco Corporation, Chicago, Ill.

[21] Appl. No.: 855,598

[22] Filed: Mar. 20, 1992

[51] Int. Cl.$^5$ .............................................. C08F 4/654
[52] U.S. Cl. ................................ 502/120; 502/107; 526/124
[58] Field of Search .................... 502/120, 107

[56] References Cited

U.S. PATENT DOCUMENTS

| | | | |
|---|---|---|---|
| 4,540,679 | 9/1985 | Arzoumanidis et al. | 502/111 |
| 4,612,299 | 9/1986 | Arzoumanidis et al. | 502/120 X |
| 4,866,022 | 9/1989 | Arzoumanidis et al. | 502/120 |
| 4,946,816 | 8/1990 | Cohen et al. | 502/126 |
| 4,988,656 | 1/1991 | Arzoumanidis et al. | 502/120 X |
| 5,013,702 | 5/1991 | Arzoumanidis et al. | 502/120 |
| 5,124,297 | 6/1992 | Arzoumanidis et al. | 502/120 |

*Primary Examiner*—Patrick P. Garvin
*Attorney, Agent, or Firm*—James R. Henes; Wallace L. Oliver; Frank J. Sroka

[57] ABSTRACT

A process for making a magnesium-containing supported titanium-containing, alpha-olefin polymerization or co-polymerization catalyst or catalyst component having a large particle size, semi-spherical particle shape and high resistance to attrition.

19 Claims, No Drawings

OLEFIN POLYMERIZATION AND COPOLYMERIZATION CATALYST

BACKGROUND OF THE INVENTION

1. Field of the Invention

This invention relates to a catalyst component or catalyst that is useful for the stereoregular polymerization or copolymerization of alpha-olefins and more particularly concerns a magnesium-containing supported titanium-containing catalyst component or catalyst that is useful for producing a homopolymer or copolymer of an alpha-olefin.

2. Discussion of the Prior Art

Although many polymerization and copolymerization processes and catalyst systems have been described for polymerizing or copolymerizing alpha-olefins, it is highly desirable to develop a catalyst component or a catalyst that has improved activity for catalyzing such reactions. It is also advantageous to tailor a process and catalyst system to obtain a specific set of properties of a resulting polymer or copolymer product. For example, commercial alpha-olefin polymerization or copolymerization, especially gas-phase alpha-olefin polymerization or copolymerization, requires additional catalyst attributes for economical large-scale operation. Specifically, polymer or copolymer morphology is often critical and typically depends upon catalyst morphology. Good polymer morphology generally involves uniformity of particle size and shape, a narrow particle size distribution, resistance to attrition and an acceptably high bulk density. Minimization of very small particles (fines) typically is very important, especially in gas-phase polymerizations or copolymerizations in order to avoid transfer or recycle line plugging. From the standpoint of polymerization process efficiency, high levels of small polymer particles can cause problems because the particles tend to accumulate in, and plug, process lines and filters. From the standpoint of handling and processing of polyolefins, small polymer particles and broad particle size distribution can be disadvantageous because polymer bulk density often is lower than desired and an extrusion and/or pelletization step often is required prior to processing.

Therefore, it is highly desirable to develop alpha-olefin polymerization and copolymerization catalysts and catalyst components that have improved morphology. For example, experience indicates that, in order to produce high ethylene content/high melt flow rate impact copolymers of ethylene and propylene having a median particle size of at least 1000 microns, it is necessary to employ a copolymerization catalyst having a median particle size of at least 35–55 microns. Another property which is important commercially is the maintenance of an acceptably high bulk density. Typically, this property is measured in pounds per cubic foot of polymer or copolymer. Also important is maintaining low atactic levels such as measured by hexane soluble and extractable materials formed during polymerization or copolymerization.

Magnesium-containing supported titanium halide-based alpha-olefin polymerization or copolymerization catalyst components or catalyst systems containing such components are now well known in the art. Typically, these catalyst components and catalyst systems are recognized for their performance based on activity and stereospecificity. However, commercial olefin polymerization or copolymerization requires additional catalyst attributes for economical large-scale operation. In particular, it is highly desirable to develop a catalyst, or catalyst component, or a method for producing such catalyst or catalyst component, that could be modified readily so that the resulting catalyst or catalyst component could have a wide range of catalytic activities or could be used to produce a wide range of polymers and copolymers having different sets of properties.

Numerous individual processes or process steps have been disclosed which have as their purpose the provision of improved supported, magnesium-containing, titanium-containing, electron donor-containing olefin polymerization or copolymerization catalysts. More particularly, Arzoumanidis et al., U.S. Pat. Nos. 4,866,022; 4,988,656; and 5,013,702 disclose a method for forming a particularly advantageous alpha-olefin polymerization or copolymerization catalyst or catalyst component that involves a specific sequence of specific individual process steps such that the resulting catalyst or catalyst component has exceptionally high activity and stereospecificity combined with very good morphology. A solid hydrocarbon-insoluble, alpha-olefin polymerization or copolymerization catalyst or catalyst component with superior activity, stereospecificity and morphology characteristics is disclosed as comprising the product formed by 1) forming a solution of a magnesium-containing species from a magnesium hydrocarbyl carbonate or magnesium carboxylate; 2) precipitating solid particles from such magnesium-containing solution by treatment with a transition metal halide and an organosilane as a morphology controlling agent; 3) reprecipitating such solid particles from a mixture containing a cyclic ether; and 4) treating the reprecipitated particles with a transition metal compound and an electron donor. In U.S. Pat. Nos. 4,866,022; 4,988,656; and 5,013,702, this treatment in the fourth step was performed at either 135° C., 137°–143° C. or 120° C. in Examples 1–17 or initially at 110° C. and then at 93°–96° C. in Example 18, or initially at 130° C. for 90 minutes and then heating was stopped for the next 8 minutes in Example 20. Alcohols that are useful in solvating magnesium carbonates are disclosed in column 4, lines 36–44 of U.S. Pat. No. 4,866,022 as including: "those having the structure HOR' wherein R' is an alkyl radical of 1 to about 18 carbon atoms, an aryl radical of 6 to about 12 carbon atoms or an alkaryl or aralkyl radical of 7 to about 12 carbon atoms. Typically, one or more alcohols containing from 1 to 12 carbon atoms can be used such as methanol, ethanol, propanol, isopropanol, tert-butyl alcohol, cyclohexanol, 2-ethylhexanol, dodecanol, and the like. Of these, 2-ethyl-1-hexanol is preferred." The ratio of the total number of moles of the alcohol employed-to-the magnesium hydrocarbyl carbonate or carboxylate from which the magnesium-containing species is formed in the examples in U.S. Pat. No. 4,886,022 is 1.32:1.

Arzoumanidis et al., U.S. Pat. No. 4,540,679 discloses a process for the preparation of a magnesium hydrocarbyl carbonate by reacting a suspension of a magnesium alcoholate in an alcohol with carbon dioxide and reacting the magnesium hydrocarbyl carbonate with a transition metal component. Sufficient alcohol is employed to form a solution of the resulting magnesium hydrocarbyl carbonate in the alcohol. The ratio of the total number of moles of the alcohol employed-to-the magnesium alcoholate in the examples in U.S. Pat. No. 4,540,679 is 3.9:1 to 10.5:1.

Arzoumanidis et al., U.S. Pat. No. 4,612,299 discloses a process for the preparation of a magnesium carboxylate by reacting a solution of a hydrocarbyl magnesium compound with carbon dioxide to precipitate a magnesium carboxylate and reacting the magnesium carboxylate with a transition metal component. Alcohols are not disclosed as suitable for use as a solvent or diluent in the process disclosed therein.

While each of the processes of the aforesaid U.S. Pat. Nos. 4,540,679; 4,612,299; 4,866,022; 4,988,656; and 5,013,702 affords alpha-olefin polymerization or copolymerization catalysts or catalyst components which have improved morphology and which afford polymer or copolymer products which also have improved morphology, it is highly desirable to develop additional alpha-olefin polymerization or copolymerization catalysts or catalyst components that have even further improved morphology and that afford polymers or copolymers, especially the aforesaid impact copolymers, which also have even further improved morphology.

Cohen et al., U.S. Pat. No. 4,946,816 discloses the addition of a $C_8$–$C_{10}$ aromatic compound to the solvent in any of the aforesaid steps Nos. 1), 2) or 3) of the aforesaid U.S. Pat. Nos. 4,866,022; 4,988,656; 5,013,702; 4,540,679; and 4,612,299, at any time prior to the addition of ether in the aforesaid step 3), in order to control the morphology of the final particles of the resulting catalyst or catalyst component. Particular $C_8$–$C_{10}$ aromatic compounds that are suitable morphology control agents include o-xylene, m-xylene, p-xylene, mixed xylenes, ethylbenzene, naphthalene, cumene, pseudocumene, methylethyl benzenes, tetrahydronaphthalene, and diethylbenzenes. Ethylbenzene, orthoxylene, metaxylene, paraxylene and naphthalene are preferred. Mixtures of $C_8$–$C_{10}$ aromatic compounds may also be used. Naphthalene is most preferred. Preferably the $C_8$–$C_{10}$ aromatic compound is introduced in step 2) of the method of their invention, although such aromatic compound may also be introduced in step 1) of the method of their invention or in step 3) before addition of the cyclic ether. Typically, from about 1000 to about 20,000 parts by weight or 0.1–2 wt. % of such $C_8$–$C_{10}$ aromatic compound per million parts of the total amount of material present are incorporated within the solvent to effect the desired morphology change. Preferably, about 2000 to about 10,000 parts per million of such $C_8$–$C_{10}$ aromatic compound are used. For a solvent incorporating only a $C_8$ aromatic compound, the most preferred range is about 4000 to about 10,000 of the $C_8$ aromatic compound.

Arzoumanidis, Drezdzon and Lee, pending U.S. patent application Ser. No. 07/624,210, filed Dec. 7, 1990 and now U.S. Pat. No. 5,124,297, disclose a catalyst or component and a method of production thereof, which are based on the catalyst or catalyst component and method of production thereof, respectively, of the aforesaid U.S. Pat. Nos. 4,540,679; 4,612,299; 4,866,022; 4,988,656; and 5,013,702, wherein the resulting catalyst or catalyst component has a relatively larger median particle size and a relatively narrower particle size distribution and is particularly effective for the production of homopolymers of propylene and copolymers of propylene and ethylene, especially high ethylene content/high melt flow rate impact copolymers of propylene and ethylene, which homopolymers and copolymers have a relatively larger medium particle size and a relatively narrower particle size distribution. The key additional feature of the method of U.S. patent application Ser. No. 07/624,210 (now U.S. Pat. No. 5,124,297) is that the solution of the magnesium-containing species that is formed comprises at least one alcohol containing from 1 to about 18 carbon atoms at a ratio of the total number of moles of the at least one alcohol-to-the number of moles of the aforesaid magnesium-containing compound in the range of from about 1.45:1, preferably from about 1.6:1, to about 2.3:1, preferably to about 2.1:1. Alcohols that are suitable for use in the method of U.S. patent application Ser. No. 07/624,210 include those having the structure HOR wherein R is an alkyl radical of 1 to about 18 carbon atoms, an aryl radical of 6 to about 12 carbon atoms or an alkaryl or aralkyl radical of 7 to about 12 carbon atoms. Typically, one or more alcohols containing from 1 to 12 carbon atoms can be used, such as ethanol, 1- or 2-propanol, t-butyl alcohol, cyclohexanol, 2-ethylhexanol, the amyl alcohols including isoamyl alcohol, and the branched alcohols having 9 to 12 carbon atoms. Preferably, 2-ethylhexanol and/or ethanol is employed.

All or only a portion of the total amount employed, or any component of the at least one alcohol employed in the method of U.S. patent application Ser. No. 07/624,210 (now U.S. Pat. No. 5,124,297), can be present in the aforesaid liquid when the magnesium-containing species is formed from the magnesium-containing compound or when the magnesium-containing species is dissolved in the aforesaid liquid in the aforesaid step 1. In the alternative, all or a portion of the at least one alcohol employed, or any component thereof, can be added to the aforesaid liquid after the magnesium-containing species is formed from the magnesium-containing compound or after the magnesium-containing species is dissolved in the aforesaid liquid, but the total amount of the aforesaid at least one alcohol must be added before or when the solid particles are being precipitated in the aforesaid step 2 in the aforesaid U.S. Pat. Nos. 4,540,679; 4,612,299; 4,866,022; 4,988,656; and 5,013,702, except when the solid particles are re-precipitated.

Preferably, in the method of U.S. patent application Ser. No. 07/624,210 (now U.S. Pat. No. 5,124,297), the at least one alcohol comprises a combination of a relatively lower molecular weight monohydroxy alcohol containing from 1 to 4 carbon atoms and a relatively higher molecular weight monohydroxy alcohol containing from 5 to about 18 carbon atoms, and at a ratio of the number of moles of the relatively lower molecular weight alcohol-to-the total number of moles of total alcohols in the range of from about 0.45:1, preferably from about 0.5:1, to about 0.85:1, preferably to about 0.8:1. Preferably, the relatively lower molecular weight alcohol is ethanol and the relatively higher molecular weight alcohol is 2-ethylhexanol or an amyl alcohol. Therefore, as indicated hereinabove, all or a portion of either or both components of this combination can be present in the aforesaid liquid when the magnesium-containing species is formed from the magnesium-containing compound or when the magnesium-containing species is dissolved in the aforesaid liquid in the aforesaid step 1 in the aforesaid U.S. Pat. Nos. 4,540,679; 4,612,299; 4,866,022; 4,988,656; and 5,013,702, or can be added to the aforesaid liquid after the magnesium-containing species is formed from the magnesium-containing compound or after the magnesium-containing species is dissolved in the aforesaid liquid.

The benefits resulting from the use of the aforesaid at least one alcohol to produce the catalyst or catalyst component in the method of U.S. patent application Ser. No. 07/624,210 (now U.S. Pat. No. 5,124,297) at a level in the range of from about 1.45 to about 2.3 total moles of the at least one alcohol per mole of the magnesium-containing compound are (1) the production of a reduced number of catalyst fines and hence of small polymer or copolymer particles produced using such catalyst or catalyst component; and (2) the production of catalyst or catalyst component having a relatively larger mean particle size and relatively narrower particle size distribution the use of which affords polymer or copolymer also having a larger mean particle size and improved particle size distribution and bulk density; (3) a substantially less viscous solution in the aforesaid step 1 in the aforesaid U.S. Pat. Nos. 4,540,679; 4,612,299; 4,866,022; 4,988,656; and 5,013,702. These benefits are further enhanced by the use of the aforesaid combination of the relatively lower and relatively higher molecular weight alcohols.

Nevertheless, it is highly desirable to develop an improved method for the manufacture of a catalyst or catalyst component for the polymerization or copolymerization of alpha-olefins, in which the catalyst or catalyst component produced not only has a relatively large medium particle size and relatively narrow particle size distribution but also has a more uniform, especially substantially spheroidal, particle shape and is more resistant to attrition and therefore does not need to be prepolymerized. Good polymer morphology also involves uniformity of particle shape, preferably substantially spheroidal. Thus, it is highly desirable to develop alpha-olefin polymerization and copolymerization catalysts and catalyst components that have uniform particle shape, preferably spheroidal, and resistance to attrition. Attrition of catalyst or catalyst component particles having a relatively large median particle size and/or a uniform shape, results in the formation of particles, especially fines, of the catalyst or catalyst component having a smaller medium particle size and a nonuniform particle shape and a broadening of the particle size distribution of the catalyst or catalyst component. The additional step of prepolymerization of the catalyst or catalyst component with an alpha-olefin is often preferred or even essential in order to improve the attrition resistance of the particles of the catalyst or catalyst component before use as a polymerization or copolymerization catalyst or catalyst component. It is also highly desirable to eliminate the need to prepolymerize the catalyst or catalyst component before using it as a polymerization or copolymerization catalyst or catalyst component.

Both Terano, Soga, and Inoue, Japanese Kokai No. 63105007 (May 10, 1988) and Terano and Soga, Japanese Kokai No. 91,227,309 (Oct. 8, 1991) disclose the use of some form of a temperature reduction during or after activation of a solid catalyst component for use in olefin polymerization. For example, in Example 1 in Japanese Kokai No. 63105007, magnesium metal, iodine and n-butylchloride were mixed below the boiling temperature of n-butylchloride, and the resulting solids were washed with n-butylchloride. The washed solids were then mixed with di-n-butylphthalate and titanium tetrachloride, and the mixture was ball milled. The ball milled solids were next activated twice with toluene and titanium chloride at 115° C. for 2 hours for each activation. The activated solids were then cooled to 40° C. and washed with heptane. Similarly, in Example 1 in Japanese Kokai No. 91,227,309, magnesium ethoxide toluene and titanium tetrachloride were heated at 70° C., butanol was added to the mixture; and then the temperature was raised to 90° C. and phthaloyl dichloride was added to the mixture. The resulting mixture was then mixed at 115° C. for 2 hours, after which time the solids were separated and washed with toluene. The resulting solids were then activated three times with toluene and titanium tetrachloride at 115° C. for 2 hours for each activation. The activated solids were washed with heptane at 40° C.

OBJECTS OF THE INVENTION

It is therefore a general object of the present invention to provide an improved alpha-olefin polymerization or copolymerization catalyst or catalyst component having improved morphology and an improved process for producing such catalyst or catalyst component.

More particularly, it is an object of the present invention to provide an alpha-olefin polymerization or copolymerization catalyst or catalyst component having improved median particle size, particle size distribution, particle shape and resistance to attrition.

It is a related object of the present invention to provide an improved process for making an alpha-olefin polymerization or copolymerization catalyst or catalyst component having improved median particle size, particle size distribution, particle shape, resistance to attrition, and bulk density, and at a relatively high yield.

It is a further object of the present invention to provide an improved catalyst or catalyst component for the production of high ethylene content/high melt flow rate impact copolymers of ethylene and propylene and a process for making such catalyst or catalyst component.

Other objects and advantages of the present invention will become apparent upon reading the following detailed description and appended claims.

SUMMARY OF THE INVENTION

These objects are achieved by the solid, hydrocarbon-insoluble catalyst or catalyst component of this invention for the polymerization or copolymerization of alpha-olefins, comprising a product formed by: (A) forming a solution of a magnesium-containing species in a liquid, wherein the magnesium-containing species is formed by reacting a magnesium-containing compound with carbon dioxide or sulfur dioxide; (B) precipitating solid particles from the solution of the magnesium-containing species by treatment with a transition metal compound or a halide of a Group IV element; and (D) treating the precipitated particles with a titanium compound and an electron donor at a first temperature in the range of from about 85° C. to about 140° C. and then at a second temperature in the range of from about 25° C. to about 100° C. for a period of at least about 1 hour, wherein the second temperature is from about 30 to about 70 degrees below the first temperature; and wherein the solution of the magnesium-containing species comprises at least one alcohol containing from 1 to 18 carbon atoms and the ratio of the total number of moles of the at least one alcohol-to-the number of moles of the magnesium-containing compound is in the range of from about 1.45:1 to about 2.05:1.

The aforesaid objects are also achieved by the method of this invention comprising the aforesaid steps (A), (B) and (D) to make the aforesaid catalyst or catalyst component of this invention.

DETAILED DESCRIPTION OF THE PREFERRED EMBODIMENTS

The solid, hydrocarbon-insoluble catalyst or catalyst component of this invention for the stereoregular polymerization or copolymerization of alpha-olefins comprises the product formed by the process of this invention, which comprises the Step (A) of forming a solution of a magnesium-containing species in a liquid wherein the magnesium-containing species is formed by reacting a magnesium-containing compound with carbon dioxide or sulfur dioxide. The magnesium-containing compound from which the magnesium-containing species is formed is a magnesium alcoholate, a magnesium hydrocarbyl alcoholate, or a hydrocarbyl magnesium compound. When carbon dioxide is employed, the magnesium-containing species is a hydrocarbyl carbonate or a carboxylate. When sulfur dioxide is employed, the resulting magnesium-containing species is an hydrocarbyl sulfite ($ROSO_2-$) or an hydrocarbyl sulfinate ($RSO_2-$). Since the use of carbon dioxide is highly preferred, hereinafter the description is written as if carbon dioxide is used.

When a magnesium alcoholate is employed, the resulting magnesium-containing species is a magnesium hydrocarbyl carbonate. Generally, the magnesium hydrocarbyl carbonate can be prepared by reacting carbon dioxide with the magnesium alcoholate. For example, the magnesium hydrocarbyl carbonate can be formed by suspending magnesium ethoxide in ethanol, adding carbon dioxide until the magnesium ethoxide dissolves forming magnesium ethyl carbonate. If, however, the magnesium ethoxide were suspended instead in 2-ethylhexanol, at least one of magnesium 2-ethylhexyl carbonate, magnesium ethyl carbonate and magnesium ethyl/2-ethylhexyl carbonate is formed. If the magnesium ethoxide is suspended in a liquid hydrocarbon or halohydrocarbon that is free of alcohol, the addition of carbon dioxide results in the breaking apart of the magnesium ethoxide particles and the magnesium hydrocarbyl carbonate reaction product does not dissolve. The reaction of a magnesium alcoholate with carbon dioxide can be represented as follows:

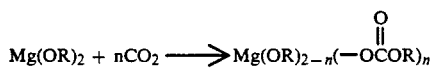

wherein n is a whole number or fraction up to 2, and wherein R is a hydrocarbyl group of 1 to 20 carbon atoms. In addition, a magnesium alcoholate containing two different aforesaid hydrocarbyl (R) groups can be employed. From the standpoint of cost and availability, magnesium alcoholates which are preferred for use according to this invention are those of the formula $Mg(OR')_2$ wherein R' is as defined above. In terms of catalytic activity and stereospecificity, best results are achieved through the use of magnesium alcoholates of the formula $Mg(OR')_2$ wherein R' is an alkyl radical of 1 to about 8 carbon atoms, an aryl radical of 6 to about 12 carbon atoms or an alkaryl or aralkyl radical of 7 to about 12 carbon atoms. Best results are attained through the use of magnesium ethoxide.

Specific examples of magnesium alcoholates that are useful according to this invention include the following: $Mg(OCH_3)_2$, $Mg(OC_2H_5)_2$, $Mg(OC_4H_9)_2$, $Mg(OC_6H_5)_2$, $Mg(OC_6H_{13})_2$, $Mg(OC_9H_{19})_2$, $Mg(OC_{10}H_7)_2$, $Mg(OC_{12}H_9)_2$, $Mg(OC_{12}H_{25})_2$, $Mg(OC_{16}H_{33})_2$, $Mg(OC_{18}H_{37})_2$, $Mg(OC_{20}H_{41})_2$, $Mg(OCH_3)(OC_2H_5)$, $Mg(OCH_3)(OC_6H_{13})$, $Mg(OC_2H_5)(OC_8H_{17})$, $Mg(OC_6H_{13})(OC_{20}H_{41})$, $Mg(OC_3H_7)(OC_{10}H_7)$, $Mg(OC_2H_4Cl)_2$ and $Mg(OC_{16}H_{33})(OC_{18}H_{37})$. Mixtures of magnesium alcoholates can also be employed if desired.

A suitable magnesium hydrocarbyl alcoholate has the formula $MgR(OR')$ wherein R and R' are as defined hereinabove for the magnesium alcoholate. On the one hand, when alcohol is used as the suspending medium for the reaction between the magnesium hydrocarbyl alcoholate and carbon dioxide, the magnesium hydrocarbyl alcoholate is a functional equivalent of the magnesium alcoholate because the magnesium hydrocarbyl alcoholate is converted to the magnesium alcoholate in alcohol. On the other hand, when the suspending medium does not contain alcohol, the magnesium hydrocarbyl alcoholate reacts with carbon dioxide as follows:

In this case,

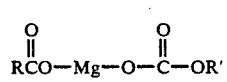

is the resulting magnesium-containing species.

When the magnesium compound from which the magnesium-containing species is formed is a hydrocarbyl magnesium compound having the formula $XMgR$, where X is a halogen and R is a hydrocarbyl group of 1 to 20 carbon atoms, the reaction of the hydrocarbyl magnesium compound with carbon dioxide forms a magnesium carboxylate and can be represented as follows:

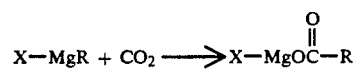

If the hydrocarbyl magnesium compound contains two hydrocarbyl groups, the reaction can be represented as follows:

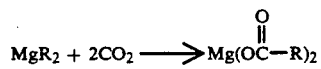

where R is as defined for X-MgR.

The hydrocarbyl magnesium compounds useful in this invention have the structure R-Mg-Q wherein Q is hydrogen, halogen or R' (each R' is independently a hydrocarbyl group of 1 to 20 carbon atoms.) Specific examples of hydrocarbyl magnesium compounds useful in this invention include: $Mg(CH_3)_2$, $Mg(C_2H_5)_2$, $Mg(C_4H_9)_2$, $Mg(C_6H_5)_2$, $Mg(C_6H_{13})_2$, $Mg(C_9H_{19})_2$, $Mg(C_{10}H_7)_2$, $Mg(C_{12}H_9)_2$, $Mg(C_{12}H_{25})_2$, $Mg(C_{16}H_{33})_2$, $Mg(C_{20}H_{41})_2$, $Mg(CH_3)(C_2H_5)$, $Mg(CH_3)(C_6H_{13})$, $Mg(C_2H_5)(C_8H_{17})$, $Mg(C_6H_{13})(C_{20}H_{41})$, $Mg(C_3H_7)(C_{10}H_7)$, $Mg(C_2H_4Cl)_2$ and $Mg(C_{16}H_{33})(C_{18}H_{37})$, $Mg(C_2H_5)(H)$, $Mg(C_2H_5)(Cl)$, $Mg(C_2H_5)(Br)$, etc. Mixtures of hydrocarbyl magnesium compounds also can be employed if desired. From the standpoint of cost and availability, dihydrocarbyl magnesium compounds preferred for use in this invention are those of the formula $MgR_2$ wherein R is as defined above. In terms of catalytic activity and stereospecificity, best results are achieved through the use of hydrocarbyl magnesium halide compounds of the formula MgR'Q' wherein R' is an alkyl radical of 1 to about 18 carbon atoms, an aryl radical of 6 to about 12 carbon atoms or an alkaryl or aralkyl radical of 7 to about 12 carbon atoms and Q' is chloride or bromide.

Preferably, the magnesium-containing compound is a magnesium alcoholate, and the resulting magnesium-containing species is a magnesium hydrocarbyl carbonate. For example, a magnesium alcoholate can be employed that is prepared by reacting magnesium metal turnings to completion with a lower molecular weight alcohol, such as methanol, ethanol, or 1-propanol, with or without a catalyst such as iodine or carbon tetrachloride, to form a solid magnesium alcoholate. Any excess alcohol is removed by filtration, evaporation or decantation.

Diluents or solvents suitable for use in the carbonation of the magnesium compounds to form the magnesium-containing species include alcohols containing from 1 to 12 carbon atoms, non-polar hydrocarbons and halogenated derivatives thereof, ethers and mixtures thereof that are substantially inert to the reactants employed and, preferably, are liquid at the temperatures of use. It also is contemplated to conduct the reaction at elevated pressure so that lower-boiling solvents and diluents can be used even at higher temperatures. Examples of useful solvents and diluents include alcohols such as methanol, ethanol, 1- or 2-propanol, t-butyl alcohol, benzyl alcohol, the amyl alcohols, 2-ethylhexanol and branched alcohols containing 9 or 10 carbon atoms; alkanes such as hexane, cyclohexane, ethylcyclohexane, heptane, octane, nonane, decane, undecane, and so forth; haloalkanes such as 1,1,2-trichloroethane, carbon tetrachloride, etc., aromatics such as xylenes and ethylbenzene; and halogenated and hydrogenated aromatics such as chlorobenzene, o-dichlorobenzene, tetrahydronaphthalene and decahydronaphthalene.

In somewhat greater detail, the magnesium-containing species is prepared by dissolving or suspending the magnesium-containing compound in a liquid. Approximately 10 to 80 parts by weight of the magnesium-containing compound is employed per 100 parts by weight liquid. A sufficient amount of carbon dioxide is bubbled into the liquid suspension to provide from about 0.1 to 4 moles of carbon dioxide per mole of the magnesium compound with mild stirring. Approximately 0.3 to 4 moles of $CO_2$ are added to the solution or suspension of the magnesium-containing compound with stirring at a temperature of about 0° to 100° C. over a period of approximately 10 minutes to 24 hours.

Regardless of which of the aforesaid magnesium-containing compounds is employed to form the magnesium-containing species, solid particles are next precipitated in Step B from the aforesaid solution of the magnesium-containing species by treatment of the solution with a transition metal compound or Group IV halide. Suitable transition metal compounds which can be used for this purpose include compounds represented by the formula $T_aY_bX_{c-b}$ wherein $T_a$ is a transition metal selected from Groups IV-B, V-B and VI-B of the Periodic Table of Elements, Y is oxygen, OR' or $NR'_2$; wherein each R' is independently hydrogen or a hydrocarbyl group of 1 to 20 carbon atoms; X is halogen, preferably chlorine or bromine; c has a value corresponding to the valence of the transition metal, $T_a$; b has a value of from 0 to 5 with a value of c-b being from at least 1 up to the value of the valence state of the transition metal $T_a$. Suitable transition metal compounds include halide compounds of titanium, zirconium, vanadium and chromium, such as chromyl chloride, vanadium oxytrichloride, zirconium tetrachloride, vanadium tetrachloride, etc. The transition metal compound or Group IV halide preferably is a titanium (IV) compound or a silicon halide and more preferably is titanium tetrachloride.

In addition, the use of a morphology control agent at any point prior to the addition of the ether in Step C described hereinbelow, that is in Step A or preferably in Step B, is preferred in order to control the morphology of the final particles of the resulting catalyst or catalyst component. While any convenient conventional morphology controlling agent can be employed, organosilanes are particularly suitable for use as the morphology controlling agent. Suitable organosilanes for this purpose have a formula: $R_nSiR'_{4-n}$, wherein n=0 to 4 and wherein R is hydrogen or an alkyl, alkoxy, haloalkyl or aryl radical containing one to about ten carbon atoms, or a halosilyl radical or haloalkylsilyl radical containing one to about eight carbon atoms, and R' is OR or a halogen. Typically, R is an alkyl or chloroalkyl radical containing one to about eight carbon atoms and one to about four chlorine atoms, and R' is chlorine or an —OR radical containing one to four carbon atoms. A suitable organosilane may contain different R' groups. Mixtures of organosilanes may be used. Preferable organosilanes include tri-methylchlorosilane, trimethylethoxysilane, dimethyldichlorosilane, tetraethoxy-silane, and hexamethyldisiloxane.

The morphology controlling agent can also be an o-, m- or p-dialkylphalate ester or an o-, m-, or p-alkyl aralkylphthalate ester. Each alkyl moiety of a suitable dialkylphthalate ester may be the same or different and each contains from 1 to 10, preferably to 4, carbon atoms. Preferably an o-dialkylphthalate ester is employed, more preferably an o-dibutylphthalate ester is employed; and most preferably o-di-n-butylphthalate or o-di-i-butylphthalate is employed. Other suitable dialkylphthalate esters include dihexylphthalate and dioctylphthalate. In a suitable alkyl aralkylphthalate ester, the alkyl moiety contains from 1 to 10, preferably to 6, carbon atoms and the aralkyl moiety contains from 7 to 10, preferably to 8, carbon atoms. Preferably an o-alkyl aralkylphthalate ester is employed. Suitable alkyl aralkylphthalate esters include benzyl n-butylphthalate and benzyl-i-butylphthalate.

In addition, a $C_8$–$C_{10}$ aromatic compound in the solvent at any time prior to the addition of ether in the aforesaid Step C), can be used in order to control the morphology of the final particles of the resulting catalyst or catalyst component. Particular $C_8$–$C_{10}$ aromatic compounds that are suitable morphology control agents include o-xylene, m-xylene, p-xylene, mixed xylenes, ethylbenzene, naphthalene, cumene, pseudocumene, methylethyl benzenes, tetrahydronaphthalene, and diethylbenzenes. Ethyl benzene, ortho-xylene, meta-xylene, paraxylene and naphthalene are preferred. Mixtures of $C_8$–$C_{10}$ aromatic compounds may also be used. Naphthalene is most preferred. Preferably the $C_8$–$C_{10}$ aromatic compounds are introduced in Step B of the method of this invention, although such aromatics may also be introduced in Step A of the method of this invention or in Step C discussed herebelow before addition of the cyclic ether. Typically, from about 1000 to about 20,000 parts by weight or 0.1-2 wt % of such $C_8$-$C_{10}$ aromatic compounds per million parts of the total amount of material present are incorporated within the solvent to effect the desired morphology change. Preferably, about 2000 to about 10,000 parts per million of such $C_8$-$C_{10}$ aromatic compounds are used. For a solvent incorporating only $C_8$ aromatic compounds, the most preferred range is about 4000 to about 10,000 of $C_8$ aromatic compounds.

Another example of a suitable morphology control agent is a trialkyl ester of a tricarboxylic acid, wherein each alkyl moiety may be the same or different and each contains from 1 to 10, preferably to 4, carbon atoms. A typical example is tributyl trimesate.

The solution of the magnesium-containing species comprises at least one alcohol containing from 1 to 18 carbon atoms at a ratio of the total number of moles of the at least one alcohol-to-the number of moles of the aforesaid magnesium-containing compound in the range of from about 1.45:1, preferably from about 1.6:1, to about 2.05:1, preferably to about 1.90:1. Alcohols that are suitable for use in the present invention include those having the structure HOR wherein R is an alkyl radical of 1 to about 18 carbon atoms, an aryl radical of 6 to about 12 carbon atoms or an alkaryl or aralkyl radical of 7 to about 12 carbon atoms. Typically, one or more alcohols containing from 1 to 12 carbon atoms can be used, such as methanol, ethanol, 1- or 2-propanol, n-butyl alcohol, t-butyl alcohol, cyclohexanol, 2-ethyl-hexanol, the amyl alcohols including isoamyl alcohol, and the branched alcohols having 9 to 12 carbon atoms.

All or only a portion of the total amount of the at least one alcohol employed or any component thereof can be present in the aforesaid liquid when the magnesium-containing species is formed from the magnesium-containing compound or when the magnesium-containing species is dissolved in the aforesaid liquid in Step A. In the alternative, all or a portion of the at least one alcohol employed or any component thereof can be added to the aforesaid liquid after the magnesium-containing species is formed from the magnesium-containing compound or after the magnesium-containing species is dissolved in the aforesaid liquid, but the total amount of the aforesaid at least one alcohol must be added before or when the solid particles are being precipitated in Step B, except as described hereinbelow when the solid particles are reprecipitated in Step C.

Preferably, the at least one alcohol comprises a combination of a relatively lower molecular weight monohydroxy alcohol containing from 1 to 4 carbon atoms and a relatively higher molecular weight monohydroxy alcohol containing from 5 to about 18 carbon atoms, and at a ratio of the number of moles of the relatively lower molecular weight alcohol-to-the total number of moles of total alcohols in the range of from about 0.45:1, preferably from about 0.5:1, to about 0.85:1, preferably to about 0.8:1. The relatively lower molecular weight alcohol is preferably methanol or butanol, is more preferably methanol or n-butanol and is most preferably methanol. The relatively higher molecular weight alcohol is preferably 2-ethylhexanol or an amyl alcohol and is more preferably 2-ethylhexanol. Therefore, as indicated hereinabove, all or a portion of either or both components of this combination can be present in the aforesaid liquid when the magnesium-containing species is formed from the magnesium-containing compound or when the magnesium-containing species is dissolved in the aforesaid liquid in Step A, or can be added to the aforesaid liquid after the magnesium-containing species is formed from the magnesium-containing compound or after the magnesium-containing species is dissolved in the aforesaid liquid.

The benefits resulting from the use of the aforesaid at least one alcohol in the method of the present invention to produce the catalyst or catalyst component of the present invention at a level in the range of from about 1.45 to about 2.05 total moles of the at least one alcohol per mole of the magnesium-containing compound are (1) the production of a reduced number of catalyst fines and hence of small polymer or copolymer particles produced using such catalyst or catalyst component; and (2) the production of catalyst or catalyst component having a larger mean particle size and improved particle size distribution, the use of which affords a polymer or copolymer also having a larger mean particle size and improved particle size distribution and bulk density; (3) a substantially less viscous solution in the aforesaid Step A. These benefits are further enhanced by the use of the aforesaid combination of the relatively lower and relatively higher molecular weight alcohols.

Broadly, in accordance with this invention, the particles precipitated in Step B are treated in Step D—either directly or after first being reprecipitated in Step C as described hereinbelow—with a titanium compound and an electron donor. Titanium (IV) compounds useful in preparation of the catalyst or catalyst component of this invention are titanium halides and haloalcoholates having 1 to about 20 carbon atoms per alcoholate group such as methoxy, ethoxy, butoxy, hexoxy, phenoxy, decoxy, naphthoxy, dodecoxy and eicosoxy. Mixtures of titanium compounds can be employed if desired. Preferred titanium compounds are the halides and haloalcoholates having 1 to 8 carbon atoms per alcoholate group. Examples of such compounds include $TiCl_4$, $TiBr_4$, $Ti(OCH_3)Cl_3$, $Ti(OC_2H_5)Cl_3$, $Ti(OC_4H_9)Cl_3$, $Ti(OC_6H_5)Cl_3$, $Ti(OC_6H_{13})Br_3$, $Ti(OC_8H_{17})Cl_3$, $Ti(OCH_3)_2Br_2$, $Ti(OC_2H_5)_2Cl_2$, $Ti(OC_6H_{13})_2Cl_2$, $Ti(OC_8H_{17})Br_2$, $Ti(OCH_3)_3Br$, $Ti(OC_2H_5)_3Cl$, $Ti(OC_4H_9)_3Cl$, $Ti(OC_6H_{13})_3Br$, and $Ti(OC_8H_{17})_3Cl$. Titanium tetrahalides and particularly $TiCl_4$ are most preferred from the standpoint of attaining maximum activity and stereospecificity.

Organic electron donors useful in Step D in preparation of the stereospecific supported catalyst components of this invention are organic compounds containing oxygen, nitrogen, sulfur, and/or phosphorus. Such compounds include organic acids, organic acid anhydrides, organic acid esters, alcohols, ethers, aldehydes, ketones, amines, amine oxides, amides, thiols, various phosphorus acid esters and amides, and the like. Mixtures of organic electron donors can be employed if desired.

Specific examples of useful oxygen-containing electron donors include the organic acids and esters employed as modifiers as described above, aliphatic alcohols such as methanol, ethanol, propanols, butanols, pentanols, hexanols, and so forth, aliphatic diols and triols such as ethylene glycol, propanediols, glycerol, butanediols, butanetriols, pentanediols, pentanetriols, hexanediols, hexanetriols, and so forth; aromatic alcohols such as phenol, ditri-, and tetrahydroxybenzenes, naphthols, and dihydroxynaphthalenes; aralkyl alcohols such as benzyl alcohol, phenylethanols, phenylpropanols, phenylbutanols, phenylpentanols, phenylhexanols, and so forth; alkaryl alcohols such as cresols, xylenols, ethylphenols, propylphenols, butylphenols, pentylphenols, hexylphenols, and so forth; dialkyl ethers such as dimethyl, diethyl, methylethyl, dipropyl, dibutyl, dipentyl, dihexyl ethers, and so forth; alkylvinyl and alkylallyl ethers such as methyl-, ethyl-, propyl-, butyl-, pentyl-, and hexylvinyl, and hexylallyl ethers; alkaryl ethers such as anisole, phenetol, propylphenyl ether, butylphenyl ether, pentylphenyl ether, hexylphenyl ether and so forth; arylvinyl and arylallyl ethers such as phenylvinyl ether and phenylallyl ether; diaryl ethers such as diphenyl ether; and cyclic ethers such as dioxane and trioxane.

Specific examples of other suitable oxygen-containing organic electron donors include aldehydes such as formaldehyde, acetaldehyde, propionaldehyde, butyraldehyde, valeraldehyde, caproaldehyde, and so forth, benzylaldehyde, tolualdehyde, and alpha-tolualdehyde; and ketones such as acetone, diethyl ketone, methyl ethyl ketone, dipropyl ketone, dibutyl ketone, dipentyl ketone, dihexyl ketone, and so forth, cyclobutanone, cyclopentanone, and cyclohexanone, acetophenone, propiophenone, butyrophenone, valerophenone, caprophenone, and so forth, and benzophenone.

Specific examples of useful nitrogen-containing organic electron donors include tertiary amines wherein at least one of the groups bonded to nitrogen contains at least two carbon atoms such as dimethylethylamine, methyldiethylamine, N,N'-tetramethylethylenediamine, triethylamine, tri-n-butylamine, dimethyl-n-hexylamine, diphenylmethylamine, triphenylamine, tritolylamine, diphenylbenzylamine, diphenylethylamine, diethylphenylamine, bis(diethylamino)benzenes, and the like; saturated heterocyclic amines and derivatives thereof such as pyrrolidine, piperidine, 2-methylpyrrolidine, 2-methylpiperidine, 2,5-dimethylpyrrolidine, 2,6-dimethylpiperidine, 2,4,6-trimethylpiperidine, 2,2,6,6-tetramethylpiperidine, and the like; unsaturated heterocyclic amines and derivatives thereof such as pyridine and pyrimidine, picolines, lutidines, collidines, ethylpyridines, diethylpyridines, triethylpyridines, benzylpyridines, methylpyrimidines, ethylpyrimidines, benzylpyrimidines, and the like.

Examples of useful sulfur containing organic electron donors include thiols such as methanethiol, ethanethiol, ethanedithiol, propanethiols, butanethiols, butanediols, hexanethiols, and the like, thioethers such as ethylthioethane, ethylthio-n-butane, and the like; and other thio analogues of the above-described oxygen-containing organic electron donors.

Specific examples of useful phosphorus-containing organic electron donors include phosphorus analogues of the above-described nitrogen-containing organic electron donors such as triethylphosphine, ethyldibutylphosphine, triphenylphosphine, and the like.

Examples of useful organic electron donors containing two or more of oxygen, nitrogen, sulfur, and phosphorus include amides such as acetamide, butyramide, caproamide, benzamide, and the like, aminoalcohols such as ethanolamine, hydroxyanilines, aminocresols, and the like; amine oxides such as lutidine-N-oxides and collidine-N-oxides; aminoethers such as bis(2-ethoxyethyl)amine thioacids such as thioacetic acid, thiobutyric acid, thiovaleric acid, thiobenzoic acid, and the like; organosulfonic acids such as methanesulfonic acid, ethanesulfonic acid, phenylsulfonic acid, and the like; various phosphorus acid derivatives such as trimethyl phosphite, tri-n-propyl phosphite, triphenyl phosphite, tri(ethylthio)phosphite, hexamethylphosphoric triamide, and the like; and phosphine oxides such as trimethylphosphine oxide, triphenylphosphine oxide, and the like.

From the standpoint of catalyst performance and preparative ease, the organic electron donors which are preferred according to this invention are $C_1$-$C_6$ alkyl esters of aromatic carboxylic acids and halogen-, hydroxyl-, oxo-, alkyl, alkoxy-, and/or aryloxy-substituted aromatic monocarboxylic acids. Among these, the alkyl esters of benzoic, halobenzoic, phthalic, terephthalic and isophthalic acids wherein the alkyl group contains 1 to 6 carbon atoms, such as methyl benzoate, methyl bromobenzoate, ethyl benzoate, ethyl chlorobenzoate, ethyl bromobenzoate, ethyl benzoate, ethyl chlorobenzoate, ethyl bromobenzoate, butyl benzoate, isobutyl benzoate, diisobutyl phthalate, hexyl benzoate, and cyclohexyl benzoate are particularly preferred. Best results are attained through the use of diesters.

The electron donor is preferably an o-, m- or p-dialkylphthalate ester or an o-, m- or p-alkyl aralkylphthalate ester. Each alkyl moiety of a suitable dialkylphthalate ester may be the same or different and each contains from 1 to 10, preferably to 4, carbon atoms. Preferably an o-dialkylphthalate ester is employed; more preferably an o-dibutylphthalate ester is employed; and most preferably o-di-n-butylphthalate or o-di-i-butylphthalate is employed. Other suitable dialkylphthalate esters include dihexylphthalate and dioctylphthalate. In a suitable alkyl aralkylphthalate ester, the alkyl moiety contains from 1 to 10, preferably to 6, carbon atoms and the aralkyl moiety contains from 7 to 10, preferably to 8, carbon atoms. Preferably an o-alkyl aralkylphthalate ester is employed. Suitable alkyl aralkylphthalate esters include benzyl n-butylphthalate and benzyl-i-butylphthalate.

In Step D (the activation step), the particles formed in Step B (or if, as described below, a Step C is employed, the particles reprecipitated in Step C from the particles formed in Step B), the titanium halide component, and the organic electron donor component are reacted generally over a period of several minutes to several hours, and are contacted in amounts such that the atomic ratio of titanium to magnesium in the particles (calculated as magnesium in magnesium compound from which the magnesium-containing species is formed) is at least about 0.5:1. Preferably, this ratio ranges from about 0.5:1 to about 20:1. Greater amounts of titanium can be employed without adversely affecting catalyst component performance, but there typically is no need to exceed a titanium to magnesium ratio of about 20:1 as only a portion of the titanium is affixed to the pretreatment product during the preparative reaction. More preferably, the titanium to magnesium ratio ranges from about 2:1 to about 15:1 to ensure that the catalyst components contain sufficient titanium to exhibit good activities without being wasteful of the titanium compound employed in preparation. The electron donor component is employed in an amount ranging up from about 1.0 mole per gram atom of titanium in the titanium compound, and preferably from about 0.001 to about 0.6 mole per gram atom of titanium in the titanium compound. Best results are achieved when this ratio ranges from about 0.01 to about 0.3 mole per gram atom of titanium.

It is preferred that the electron donor compound and titanium compound can be contacted with the precipitated solid particles in the presence of an inert hydrocarbon or halogenated diluent, although other suitable techniques can be employed. Suitable diluents are those materials which are disclosed hereinabove as useful as diluents in Steps A or B or C (described below) and which are substantially inert to the components employed and are liquid at the temperature employed or can be maintained in the liquid state through the use of elevated pressure.

Preferably, activation Step D is performed as a group of activation substeps in which in Substep D-1, the particles from Step B are treated with titanium tetrachloride and then in Substep D-2 with titanium tetrachloride in the presence of the aforesaid electron donor. More preferably, additional treatment involves Substep D-3 with a liquid aromatic hydrocarbon such as toluene and finally in Substep D-4 with titanium tetrachloride. In some instances, in order to obtain a solid catalyst component having the highest activity for the polymerization of copolymerization of alpha olefins, especially propylene, Substep D-3, is repeated as Substep D-3' before Substep D-4 is performed.

In the method of the present invention, the particles precipitated in Step B (or reprecipitated in Step C, as described hereinbelow) are treated in Step D with a titanium compound and an electron donor at a first temperature in the range of from about 85° C., preferably from about 100° C., more preferably from about 110° C., to about 140° C., preferably to about 125° C., more preferably to about 120° C., and then at a second temperature in the range of from about 25° C., preferably from about 50° C., more preferably from about 70° C., to about 100° C., preferably to about 90° C., more preferably to about 80° C., for a period of at least about 1 hour, preferably at least about 2 hours, more preferably at least about 3 hours, wherein the second temperature is from about 30, more preferably, from about 40, to about 70, preferably to about 60, degrees centigrade below the first temperature. The rate of lowering the temperature from the aforesaid first temperature to the aforesaid second temperature is preferably relatively slow, at a rate of temperature decrease of preferably less than about 5° C. per minute, more preferably less than about 2° C. per minute and most preferably less than about 1° C. per minute.

For example, in one preferred embodiment, when aforesaid Substeps D-1 and D-2 are performed, Substep D-1 is performed at the aforesaid first temperature and Substep D-2 is performed at the aforesaid first temperature and then after Substep D-2 is completed, the temperature is lowered to the aforesaid second temperature. In another embodiment, when Substeps D-1, D-2, D-3 and D-4 are performed, Substeps D-1, D-2 and D-3 are performed at the aforesaid first temperature and Substep D-4 is performed at the aforesaid first temperature and then after Substep D-4 is completed, the temperature is lowered to the aforesaid second temperature.

In a highly preferred embodiment of the present invention, prior to Step D, the particles precipitated in Step B are reprecipitated in additional Step C from a solution containing a cyclic ether, and then the reprecipitated particles are treated in aforesaid Step D with a transition metal compound and an electron donor. In a typical reprecipitation procedure (Step C), the particles precipitated in Step B are entirely solubilized in the cyclic ether solvent and then particles are allowed to reprecipitate to form particles of uniform size. The preferable ether is tetrahydrofuran, although other suitable cyclic ethers, such as tetrahydropyran and 2-methyltetrahydrofuran, may be used, which can solubilize the particles formed in Step B. Also, thioethers such as tetrahydrothiophene can be used. In some instances, such as the use of 2,2,5,5-tetrahydrofuran and tetrahydropyran-2-methanol, reprecipitation occurs upon heating to about 130°–185° F. Other compounds may be used which act in an equivalent manner, i.e., materials which can solubilize the particles formed in Step B and from which solid uniform particles can be reprecipitated, such as cyclohexene oxide, cyclohexanone, ethyl acetate and phenyl acetate. Mixtures of such suitable materials may also be used.

A suitable diluent that can be used in any of the aforesaid Steps A, B or D or in the reprecipitation Step C should be substantially inert to the reactants employed and preferably is liquid at the temperatures employed. It is also contemplated to conduct the particular step in question at an elevated pressure so that lower boiling diluents can be used even at higher temperatures. Typical suitable diluents are aromatic or substituted aromatic liquids, although other hydrocarbon-based liquids may be used. Aromatic hydrocarbons, such as toluene, and substituted aromatics have been found suitable. An especially suitable diluent is a halogenated aromatic such as chlorobenzene or a mixture of a halogenated aromatic such as chlorobenzene and a halogenated aliphatic such as dichloroethane. Also useful are higher boiling aliphatic liquids such as kerosene. Mixtures of diluents may be used. One useful diluent component is Isopar G ® which is a $C_{10}$-average isoparaffinic hydrocarbon boiling at 156°–176° C. Other examples of useful diluents include alkanes such as hexane, cyclohexane, methylcyclohexane, heptane, octane, nonane, decane, undecane, and the like; haloalkanes such as 1,2-dichloroethane, 1,1,2-trichloroethane, carbon tetrachloride and the like; aromatics such as benzene, toluene, xylenes and ethylbenzene; and halogenated and hydrogenated aromatics such as chlorobenzene and o-dichlorobenzene.

Each of the aforesaid Steps A, B and D and the aforesaid reprecipitation Step C is conducted in the substantial absence of water, oxygen, carbon monoxide, and other extraneous materials capable of adversely affecting the performance of the catalyst or catalyst component of this invention. Such materials are conveniently excluded by carrying out the pretreatment in the presence of an inert gas such as nitrogen or argon, or by other suitable means. Optionally, all or part of the process can be conducted in the presence of one or more alpha-olefins which, when introduced into the preparative system in gaseous form, can serve to exclude catalyst poisons. The presence of one or more alpha-olefins also can result in improved stereospecificity. Useful alpha-olefins include ethylene, propylene, butene-1, pentene-1, 4-methylpentene-1, hexene-1, and mixtures thereof. Of course, any alpha-olefin employed should be of relatively high purity, for example, polymerization grade or higher. Other precautions which aid in excluding extraneous poisons include purification of any diluent to be employed, such as by percolation through molecular sieves and/or silica gel prior to use, and drying and/or purifying other reagents.

As a result of the above-described preparation there is obtained from Step D a solid reaction product suitable for use as a catalyst or catalyst component. Prior to such use, it is desirable to remove incompletely-reacted starting materials from the solid reaction product from Step D. This is conveniently accomplished by washing the solid from Step D, after separation from any preparative diluent, with a suitable solvent, such as a liquid hydrocarbon or chlorocarbon, preferably within a short time after completion of the preparative reaction because prolonged contact between the catalyst component and unreacted starting materials may adversely affect catalyst component performance.

Although not required, the solid reaction product prepared from Step D may be contacted with at least one Lewis acid prior to polymerization. Such Lewis acids useful according to this invention are materials which are liquid at treatment temperatures and have a Lewis acidity high enough to remove impurities such as unreacted starting materials and poorly affixed compounds from the surface of the solid reaction product from Step D. Preferred Lewis acids include halides of Group III-V metals which are in the liquid state at temperatures up to about 170° C. Specific examples of such materials include $BCl_3$, $AlBr_3$, $TiCl_4$, $TiBr_4$, $SiCl_4$, $GeCl_4$, $SnCl_4$, $PCl_3$ and $SbCl_5$. Preferable Lewis acids are $TiCl_4$ and $SiCl_4$. Mixtures of Lewis acids can be employed if desired. Such Lewis acid may be used in a compatible diluent.

Although not required, the solid reaction product from Step D may be washed with an inert liquid hydrocarbon or halogenated hydrocarbon before contact with a Lewis acid. If such a wash is conducted, it is preferred to substantially remove the inert liquid prior to contacting the washed solid with Lewis acid.

Although the chemical structure of the catalyst or catalyst components of this invention is not known precisely, the components generally comprise from about 1 to about 6 weight percent titanium, from about 10 to about 25 weight percent magnesium, and from about 45 to about 65 weight percent halogen. Preferably, the catalyst component of this invention comprise from about 2.0 to about 4 weight percent titanium, from about 15 to about 21 weight percent magnesium and from about 55 to about 65 weight percent chlorine. In the solid catalyst component of this invention produced by the method of this invention, the atomic ratio of magnesium to titanium is at least about 0.3:1 and preferably, is from about 0.4:1 to about 20:1 and more preferably, from about 0.5:1 to about 3:1.

Typically, the catalyst or catalyst component of this invention is employed in conjunction with a cocatalyst component including a Group II or III metal alkyl and, typically, one or more modifier compounds. Useful Group II and IIIA metal alkyls are compounds of the formula $MR_m$ wherein M is a Group II or IIIA metal, each R is independently an alkyl radical of 1 to about 20 carbon atoms, and m corresponds to the valence of M. Examples of useful metals, M, include magnesium, calcium, zinc, cadmium, aluminum, and gallium. Examples of suitable alkyl radicals, R, include methyl, ethyl, butyl, hexyl, decyl, tetradecyl, and eicosyl. From the standpoint of catalyst component performance, preferred Group II and IIIA metal alkyls are those or magnesium, zinc, and aluminum wherein the alkyl radicals contain 1 to about 12 carbon atoms. Specific examples of such compounds include $Mg(CH_3)_2$, $Mg(C_2H_5)_2$, $Mg(C_2H_5)$ $(C_4H_9)$, $Mg(C_4H_9)_2$, $Mg(C_6H_{13})_2$, $Mg(C_{12}H_{25})_2$, $Zn(CH_3)_2$, $Zn(C_2H_5)_2$, $Zn(C_4H_9)_2$, $Zn(C_4H_9)$ $(C_8H_{17})$, $Zn(C_6H_{13})_2$, $Zn(C_6H_{13})_3$, and $Al(C_{12}H_{25})_3$. More preferably a magnesium, zinc, or aluminum alkyl containing 1 to about 6 carbon atoms per alkyl radical is used. Best results are achieved through the use of trialkylaluminums containing 1 to about 6 carbon atoms per alkyl radical, and particularly triethylaluminum and triisobutylaluminum or a combination thereof.

If desired, metal alkyls having one or more halogen or hydride groups can be employed, such as ethylaluminum dichloride, diethylaluminum chloride, diethylaluminum hydride, diisobutylaluminum hydride, and the like.

To optimize the activity and stereospecificity of this cocatalyst system, it is preferred to employ one or more modifiers, typically electron donors, and including compounds such as silanes, mineral acids, organometallic chalcogenide derivatives of hydrogen sulfide, organic acids, organic acid esters and mixtures thereof. A typical catalyst system for the polymerization or copolymerization of alpha olefins is formed by combining the supported titanium-containing catalyst or catalyst component of this invention and an alkyl aluminum compound, together with at least one cocatalyst or external modifier which is typically an electron donor and, preferably, is a silane. Typically, useful aluminum-to-titanium atomic ratios in such catalyst systems are about 10 to about 500 and preferably about 30 to about 300. Typical aluminum-to-electron donor molar ratios in such catalyst systems are about 2 to about 60. Typical aluminum-to-silane compound molar ratios in such catalyst systems are about 3 to about 50.

Organic electron donors that are useful as external modifiers of the aforesaid cocatalyst system are organic compounds containing oxygen, silicon, nitrogen, sulfur, and/or phosphorus. Such compounds include organic acids, organic acid anhydrides, organic acid esters, alcohols, ethers, aldehydes, ketones, silanes, amines, amine oxides, amides, thiols, various phosphorus acid esters and amides, and the like. Mixtures of organic electron donors can also be employed.

Particular organic acids and esters are benzoic acid, halobenzoic acids, phthalic acid, isophthalic acid, terephthalic acid, and the alkyl esters thereof wherein the alkyl group contains 1 to 6 carbon atoms such as methyl chlorobenzoates, butyl benzoate, isobutyl benzoate, methyl anisate, ethyl anisate, methyl p-toluate, hexylbenzoate, and cyclohexyl benzoate, and diisobutyl phthalate as these give good results in terms of activity and stereospecificity and are convenient to use.

The aforesaid cocatalyst system advantageously and preferably contains an aliphatic or aromatic silane external modifier. Preferable silanes useful in the aforesaid cocatalyst system include alkyl-, aryl-, and/or alkoxy-substituted silanes containing hydrocarbon moieties with 1 to about 20 carbon atoms. Especially preferred are silanes having a formula: $SiR_nY_{4-n}$, wherein each R group is the same or different and is an alkoxy group containing 1 to about 20 carbon atoms, and each Y group is the same or different and is an alkyl or aryl group containing up to 20 carbon atoms and n is 1 or 4. Preferred aliphatic silanes include isobutyltrimethoxysilane, diisobutyldimethoxysilane, diisopropyldimethoxysilane, diphenyl dimethoxysilane, di-t-butyldimethoxysilane, and t-butyltrimethoxysilane.

The catalyst or catalyst component of this invention is useful in the stereospecific polymerization or copolymerization of alpha-olefins containing 3 or more carbon atoms such as propylene, butene-1, pentene-1, 4-methylpentene-1, and hexene-1, as well as mixtures thereof and mixtures thereof with ethylene. The catalyst or catalyst component of this invention is particularly effective in the stereospecific polymerization or copolymerization of propylene or mixtures thereof with up to about 20 mole percent ethylene or a higher alpha-olefin. According to the invention, highly crystalline polyalpha-olefin homopolymers or copolymers are prepared by contacting at least one alpha-olefin with the above-described catalyst or catalyst component of this invention under polymerization or copolymerization conditions. Such conditions include polymerization or copolymerization temperature and time, pressure(s) of the monomer(s), avoidance of contamination of catalyst, choice of polymerization or copolymerization medium in slurry processes, the use of additives to control homopolymer or copolymer molecular weights, and other conditions well known to persons skilled in the art. Slurry-, bulk-, and vapor-phase polymerization or copolymerization processes are contemplated herein.

The amount of the catalyst or catalyst component of this invention to be employed varies depending on choice of polymerization or copolymerization technique, reactor size, monomer to be polymerized or copolymerized, and other factors known to persons of skill in the art, and can be determined on the basis of the examples appearing hereinafter. Typically, a catalyst or catalyst component of this invention is used in amounts ranging from about 0.2 to 0.02 milligrams of catalyst to gram of polymer or copolymer produced.

Irrespective of the polymerization or copolymerization process employed, polymerization or copolymerization should be carried out at temperatures sufficiently high to ensure reasonable polymerization or copolymerization rates and avoid unduly long reactor residence times, but not so high as to result in the production of unreasonably high levels of stereorandom products due to excessively rapid polymerization or copolymerization rates. Generally, temperatures range from about 0° to about 120° C. with a range of from about 20° C. to about 95° C. being preferred from the standpoint of attaining good catalyst performance and high production rates. More preferably, polymerization according to this invention is carried out at temperatures ranging from about 50° C. to about 80° C.

Alpha-olefin polymerization or copolymerization according to this invention is carried out at monomer pressures of about atmospheric or above. Generally, monomer pressures range from about 20 to about 600 psi, although in vapor phase polymerizations or copolymerizations, monomer pressures should not be below the vapor pressure at the polymerization or copolymerization temperature of the alpha-olefin to be polymerized or copolymerized.

The polymerization or copolymerization time will generally range from about ½ to several hours in batch processes with corresponding average residence times in continuous processes. Polymerization or copolymerization times ranging from about 1 to about 4 hours are typical in autoclave-type reactions. In slurry processes, the polymerization or copolymerization time can be regulated as desired. Polymerization or copolymerization times ranging from about ½ to several hours are generally sufficient in continuous slurry processes.

Diluents suitable for use in slurry polymerization or copolymerization processes include alkanes and cycloalkanes such as pentane, hexane, heptane, n-octane, isooctane, cyclohexane, and methylcyclohexane; alkylaromatics such as toluene, xylene, ethylbenzene, isopropylbenzene, ethyl toluene, n-propyl-benzene, diethylbenzenes, and mono- and dialkylnaphthalenes; halogenated and hydrogenated aromatics such as chlorobenzene. Chloronaphthalene, ortho-dichlorobenzene, tetrahydronaphthalene, decahydronaphthalene; high molecular weight liquid paraffins or mixtures thereof, and other well-known diluents. It often is desirable to purify the polymerization or copolymerization medium prior to use, such as by distillation, percolation through molecular sieves, contacting with a compound such as an alkylaluminum compound capable of removing trace impurities, or by other suitable means.

Examples of gas-phase polymerization or copolymerization processes in which the catalyst or catalyst component of this invention is useful include both stirred bed reactors and fluidized bed reactor systems and are described in U.S. Pat. Nos. 3,957,448; 3,965,083; 3,971,786; 3,970,611; 4,129,701; 4,101,289; 3,652,527; and 4,003,712, all incorporated by reference herein. Typical gas phase olefin polymerization or copolymerization reactor systems comprise at least one reactor vessel to which olefin monomer and catalyst components can be added and which contain an agitated bed of forming polymer particles. Typically, catalyst components are added together or separately through one or more valve-controlled ports in the single or first reactor vessel. Olefin monomer, typically, is provided to the reactor through a recycle gas system in which unreacted monomer removed as off-gas and fresh feed monomer are mixed and injected into the reactor vessel. For copolymerization, the homopolymer formed from the first monomer in the first reactor is reacted with the second monomer in the second reactor. A quench liquid, which can be liquid monomer, can be added to polymerizing or copolymerizing olefin through the recycle gas system in order to control temperature.

Irrespective of polymerization or copolymerization technique, polymerization or copolymerization is carried out under conditions that exclude oxygen, water, and other materials that act as catalyst poisons. Also, according to this invention, polymerization or copolymerization can be carried out in the presence of additives to control polymer or copolymer molecular weights. Hydrogen is typically employed for this purpose in a manner well known to persons of skill in the art. Although not usually required, upon completion of polymerization or copolymerization, or when it is desired to terminate polymerization or copolymerization or at least temporarily deactivate the catalyst or catalyst component of this invention, the catalyst can be contacted with water, alcohols, acetone, or other suitable catalyst deactivators in a manner known to persons of skill in the art.

The products produced in accordance with the process of this invention are normally solid, predominantly isotactic polyalpha-olefins. Homopolymer or copolymer yields are sufficiently high relative to the amount of catalyst employed so that useful products can be obtained without separation of catalyst residues. Further, levels of stereorandom by-products are sufficiently low so that useful products can be obtained without separation thereof. The polymeric or copolymeric products produced in the presence of the invented catalyst can be fabricated into useful articles by extrusion, injection molding, and other common techniques.

The invention described herein is illustrated, but not limited, by the following examples.

EXAMPLE 1

Step A—Formation of Magnesium Alkyl Carbonate Solution

Into a two-liter reactor, equipped with a mechanical stirrer and flushed with dry nitrogen, was transferred a mixture of 153 grams of magnesium ethoxide, 276 milliliters of 2-ethyl-1-hexanol and 1100 milliliters of toluene. This mixture was agitated at 450 rpm under 30 psig of carbon dioxide and heated at 93° C. for three hours. The resulting solution was transferred to a two-liter bottle. The total volume of this solution was 1530 milliliters. 1.320 moles of 2-ethylhexanol were employed per mole of magnesium ethoxide. The solution contained 0.10 gram-equivalents of magnesium ethoxide per milliliter.

Step B—Formation of Solid Particles

Into a 1.0-liter reactor was charged 300 milliliters of toluene, 1.5 milliliters of di-n-butylphthalate and 28.5 milliliters of titanium tetrachloride under a blanket of dry nitrogen. After the mixture was stirred at 300 rpm at 22°–27° C. for 15 minutes, a mixture of 228 milliliters of the Step A magnesium hydrocarbyl carbonate solution and 4.0 milliliters of dry methanol were added to the reactor through a bomb. 0.494 mole of methanol was employed per mole of magnesium ethoxide. 1.814 total moles of methanol and 2-ethylhexanol were employed per mole of magnesium ethoxide. 0.272 mole of methanol was employed per mole of all alcohols employed. Solid particles precipitated.

Step C—Reprecipitation

After the mixture containing the precipitate was stirred for five additional minutes, 30 milliliters of tetrahydrofuran (THF) were added rapidly through a syringe. The temperature in the reactor increased from 26° C. to 38° C. Whereupon, the stirring was maintained at 300 rpm and the temperature rose to 40° C. within 15 minutes. The first formed solid dissolved in the THF solution. Within about 10 minutes after the THF addition, a solid began to reprecipitate from solution. Stirring was continued for 1.75 hours at 40° C. after which agitation was stopped and the resulting solid was allowed to settle. Supernatant was decanted and the solid washed two times with 100 milliliter portions of toluene.

Step D—Titanium (IV) Compound Treatment

To the solid from Step C in the one-liter reactor were added 300 milliliters of toluene and 100 milliliters of titanium tetrachloride. The resulting mixture was heated to 117° C. within 30 minutes and stirred at 300 rpm for one hour in Substep D-1. After stirring was stopped, the resulting solid was allowed to settle and the supernatant was decanted. After 300 milliliters of toluene, 100 milliliters of titanium tetrachloride and 5.0 milliliters of di-n-butylphthalate were added to the resulting solid, the mixture was stirred in Substep D-2 at 300 rpm at 117° C. for 90 minutes and then was allowed to cool gradually over 30–45 minutes with stirring to 77° C., at which point the mixture was stirred at 300 rpm at 77° C. for 90 minutes. Next, the solid was allowed to settle and supernatant liquid was decanted. After 300 milliliters of toluene and 100 milliliters of titanium tetrachloride were added, the mixture heated at 95° C. under agitation for 60 minutes in a modified combination of Substeps D-3 and D-4, after which the agitation was stopped, and the supernatant liquid was decanted. The residue washed five times with 150 milliliter portions of hexane and the solids recovered.

The particle size distribution of the catalyst was measured using a laser diffraction particle size analyzer (Shimadzu Model SALD-1100) and found to have an average particle size distribution (PSD) for twelve catalyst samples of $d_{10}$ of 33.91 microns, $d_{50}$ of 53.67 microns, and $d_{90}$ of 71.93 microns. "$d_{10}$," "$d_{50}$," and "$d_{90}$" mean that 10, 50 and 90 percent, respectively, of the particles have particle sizes smaller than 33.91, 53.67 and 71.93 microns, respectively. $d_{50}$ is termed the median particle size. The resulting catalyst component contained 15.5 weight percent of magnesium, 3.29 weight percent of titanium and 59.0 weight percent of chlorine.

Pargas Propylene Polymerization

A two-hour Pargas propylene polymerization was performed in a 2-liter Parr reactor. The reaction initially started as a bulk polymerization at 18°–29° C. and 200–230 psig and gradually became a gas-phase polymerization as the rate of polymerization increased and the temperature rose to 71° C. within ten minutes and the pressure increased to 480–500 psig. Initially, 3.73 moles of propylene was introduced and then the solid titanium-containing catalyst component produced in Step D, triethylaluminum (TEA) as a cocatalyst, and diisopropyldimethoxysilane as an external modifier were flushed with 3.1 moles of propylene into the reactor with stirring at 700 rpm and about 36 moles of hydrogen were also introduced into the reactor. As soon as the temperature and pressure reached 71° C. and 480–500 psig, respectively, the pressure started to drop because of polymerization and within 30 to 45 minutes, the pressure reached 300 psig, at which point propylene at 300 psig was introduced continuously for the remainder of the two hour polymerization.

The resulting polymer contained 11.9 parts per million of magnesium, 2.23 parts per million of titanium, 41.0 parts per million of chlorine, and 0.47% Ext., had a bulk density (BD) of 28.2, a MFR of 6.4, and was produced at a yield of 13.0 kilograms of polypropylene per milligram of magnesium in the catalyst component. "Extractables" were determined by measuring the loss in weight of a dry sample of ground polymer after being extracted in boiling n-hexane for 3 to 6 hours. The particle size distribution of the resulting polymer particles is shown hereinbelow in Table 1.

COMPARATIVE EXAMPLE A

The procedure of Example 1 was repeated, except that the features of cooling to and stirring at 77° C. were not repeated. The resulting catalyst particles had a particle size distribution of $d_{10}$ of 32.7 microns, $d_{50}$ of 48.1 microns and $d_{90}$ of 61.4 microns. The particle size distribution of the resulting polymer particles is also shown hereinbelow in Table 1.

TABLE 1

| Particle Size Ranges (M) | Weight Percent of Polymer Particles in Particle Size Ranges | |
|---|---|---|
| | Example 1 | Comparative Example A |
| >850 | 99.02 | 98.12 |
| 710–850 | 0.31 | 0.84 |
| 600–710 | 0.13 | 0.39 |
| 500–600 | 0.05 | 0.19 |
| 425–500 | 0.02 | 0.12 |

TABLE 1-continued

| Particle Size Ranges (M) | Weight Percent of Polymer Particles in Particle Size Ranges | |
|---|---|---|
| | Example 1 | Comparative Example A |
| 300–425 | 0.11 | 0.25 |
| 212–300 | 0.03 | 0.10 |
| 150–212 | 0.04 | 0.06 |
| 75–100 | 0.01 | 0.06 |
| <75 | 0.00 | 0.01 |

EXAMPLE 2

The procedure of Example 1 was repeated, except that the slurry formed in Step C was stirred at 57° C. for 1 hour rather than at 40° C. for 1.75 hours.

The resulting solid catalyst component contained 20.1 weight percent of magnesium, 3.40 weight percent of titanium, and 54.0 weight percent of chlorine, and had a particle size distribution of $d_{10}$ of 35.28 microns, $d_{50}$ of 69.41 microns, and $d_{90}$ of 106.82 microns. The polymer produced in the Pargas polymerization contained 15.1 parts per million of magnesium, 1.70 parts per million titanium, 37.0 parts per million of chlorine, and 0.78% Ext., had a bulk density of 26.0, a MFR of 3.9, and was produced at a yield of 13.3 kilograms of polypropylene per gram of magnesium in the catalyst component.

EXAMPLE 3

The procedure of Example 2 was repeated, except that Substep D-2 was performed at 125° C. instead of at 117° C.

The resulting solid catalyst component contained 20.1 weight percent of magnesium, 3.40 weight percent of titanium, and 54.0 weight percent of chlorine, and had a particle size distribution of $d_{10}$ of 37.52 microns, $d_{50}$ of 68.81 microns, and $d_{90}$ of 101.29 microns. The polymer produced in the Pargas polymerization contained 15.1 parts per million magnesium, 1.70 parts per million of titanium, 37.0 parts per million of chlorine, and 2.10% Ext., had a bulk density of 25.8, a MFR of 6.0, and was produced at a yield of 20.9 kilograms of polypropylene per gram of magnesium in the catalyst component.

EXAMPLE 4

The procedure of Example 1 was repeated, except that Substep D-2 was performed at 125° C. instead of at 117° C. and, before allowing the resulting solids to settle in Step C, the stirring at 40° C. was conducted for 1 hour instead of for 1.75 hours.

The resulting solid catalyst component contained 18.8 weight percent of magnesium, 1.90 weight percent of titanium, and 60.0 weight percent of chlorine, and had a particle size distribution of $d_{10}$ of 37.18 microns, $d_{50}$ of 58.22 microns, and $d_{90}$ of 77.48 microns. The polymer produced in the Pargas polymerization contained 7.6 parts per million of magnesium, 0.62 parts per million of titanium, 27.0 parts per million of chlorine, and 0.50% Ext., had a bulk density of 29.3, a MFR of 10.7, and was produced at a yield of 24.7 kilograms of polypropylene per gram of magnesium in the catalyst component.

EXAMPLE 5

The procedure of Example 4 was repeated, except that before allowing the resulting solids to settle in Step C, the stirring at 40° C. was conducted for 1.75 hours instead of for 1 hour.

The resulting solid catalyst component contained 19.4 weight percent of magnesium, 1.98 weight percent of titanium, and 65.0 weight percent of chlorine, and had a particle size distribution of $d_{10}$ of 34.28 microns, $d_{50}$ of 53.50 microns, and $d_{90}$ of 71.05 microns. The polymer produced in the Pargas polymerization contained 7.4 parts per million of magnesium, 0.64 parts per million of titanium, 26.0 parts per million of chlorine, and 0.60% Ext., had a bulk density of 27.8, a MFR of 3.70, and was produced at a yield of 26.2 kilograms of polypropylene per gram of magnesium in the catalyst component.

EXAMPLE 6

The procedure of Example 2 was repeated, except that the modified combination of Substeps D-3 and D-4 was replaced by a separate Substep D-3 in which the toluene treatment alone is performed for 30 minutes at 95° C., followed by a separate Substep D-4 in which the titanium tetrachloride treatment alone was performed for 30 minutes at 95° C.

The resulting solid catalyst component contained 21.8 weight percent of magnesium, 1.97 weight percent of titanium, and 67.0 weight percent of chlorine, and had a particle size distribution of $d_{10}$ of 45.98 microns, $d_{50}$ of 67.53 microns, and $d_{90}$ of 86.29 microns. The polymer produced in the Pargas polymerization contained 11.9 parts per million of magnesium, 1.20 parts per million of titanium, and 0.61% Ext., had a bulk density of 27.5, a MFR of 5.9, and was produced at a yield of 18.3 kilograms of polypropylene per gram of magnesium in the catalyst component.

EXAMPLE 7

The procedure of Example 6 was repeated, except that after stirring the mixture in Substep D-2 at 300 rpm at 117° C. for 90 minutes, the temperature of the mixture was raised over 20 minutes to 125° C., at which point the mixture was stirred at 300 rpm at 125° C. for 90 minutes.

The resulting solid catalyst component had a particle size distribution of $d_{10}$ of 44.02 microns, $d_{50}$ of 65.33 microns, and $d_{90}$ of 84.02 microns. The polymer produced in the Pargas polymerization contained 10.9 parts per million of magnesium, 1.62 parts per million of titanium, and 0.80% Ext., and had a bulk density of 27.0 and a MFR of 5.7.

EXAMPLE 8

The procedure of Example 1 was repeated, except that both Substeps D-1 and D-2 were performed at 125° C. instead of at 117° C. and di-n-butylphthalate was introduced in Step C immediately after tetrahydrofuran was added, rather than in Step B and, before allowing the resulting solids to settle in Step C, the stirring at 40° C. was conducted for 1 hour instead of for 1.75 hours.

The resulting solid catalyst component contained 19.2 weight percent of magnesium, 1.91 weight percent of titanium, and 60.0 weight percent of chlorine, and had a particle size distribution of $d_{10}$ of 43.55 microns, $d_{50}$ of 64.95 microns, and $d_{90}$ of 83.79 microns. The polymer produced in the Pargas polymerization contained 14.0 parts per million of magnesium, 1.17 parts per million of titanium, 38.0 parts per million of chlorine, and 0.81% Ext., had a bulk density of 24.7, a MFR of 8.7, and was produced at a yield of 17.9 kilograms of polypropylene per gram of magnesium in the catalyst component.

EXAMPLE 9

The procedure of Example 8 was repeated, except that Substep D-1 was performed at 117° C. instead of at 125° C.

The resulting solid catalyst component contained 18.0 weight percent of magnesium, 1.84 weight percent of titanium, and 59.0 weight percent of chlorine, and had a particle size distribution of $d_{10}$ of 46.36 microns, $d_{50}$ of 80.46 microns, and $d_{90}$ of 114.32 microns. The polymer produced in the Pargas polymerization contained 11.7 parts per million of magnesium, 0.97 parts per million of titanium, 33.0 parts per million of chlorine, and 0.49% Ext., had a bulk density of 24.7, a MFR of 7.2, and was produced at a yield of 19.2 kilograms of polypropylene per gram of magnesium in the catalyst component.

From the above description, it is apparent that the objects of the present invention have been achieved. While only certain embodiments have been set forth, alternative embodiments and various modifications will be apparent from the above description to those skilled in the art. These alternatives are considered equivalents and within the spirit and scope of the present invention.

Having described the invention, what is claimed is:

1. A solid, hydrocarbon-insoluble catalyst or catalyst component for the polymerization or copolymerization of alpha-olefins, comprising a product formed by:
   A. forming a solution of a magnesium-containing species in a liquid, wherein the magnesium-containing species is formed by reacting a magnesium-containing compound with carbon dioxide or sulfur dioxide;
   B. precipitating solid particles from the solution of the magnesium-containing species by treatment with a transition metal compound or a halide of a Group IV non-transition metal element; and
   D. treating the precipitated particles with a titanium compound and an electron donor at a first temperature in the range of from about 85° C. to about 140° C. and then at a second temperature in the range of from about 25° C. to about 100° C. for a period of at least about 1 hour, wherein the second temperature is from about 30 to about 70 degrees below the first temperature;
   wherein the solution of the magnesium-containing species comprises at least one alcohol containing from 1 to 18 carbon atoms and wherein the ratio of the total number of moles of the at least one alcohol-to-the number of moles of the aforesaid magnesium-containing compound is in the range of from about 1.45:1 to about 2.05:1.

2. The catalyst or catalyst component of claim 1 wherein the magnesium-containing compound in Step A is reacted with carbon dioxide.

3. The catalyst or catalyst component of claim 2 wherein at least a portion of the total amount of the at least one alcohol employed is present in the aforesaid liquid when the magnesium-containing species is formed from the aforesaid magnesium-containing compound.

4. The catalyst or catalyst component of claim 2 wherein at least a portion of the total amount of at least one alcohol employed is added to the aforesaid liquid after the magnesium-containing species is formed from the aforesaid magnesium-containing compound.

5. The catalyst or catalyst component of claim 2 wherein the aforesaid at least one alcohol comprises a combination of a relatively lower molecular weight alcohol containing from 1 to 4 carbon atoms and a relatively higher molecular weight alcohol containing from 5 to 18 carbon atoms at a ratio of the number of moles of the relatively lower molecular weight alcohol-to-the total number of moles of total alcohols in the range of from about 0.45:1 to about 0.85:1.

6. The catalyst or catalyst component of claim 5 wherein the relatively lower molecular weight alcohol is methanol or butanol.

7. The catalyst or catalyst component of claim 5 wherein the relatively higher molecular weight alcohol is 2-ethylhexanol.

8. The catalyst or catalyst component of claim 2 wherein a morphology controlling agent is employed in Step B or Step A.

9. The catalyst or catalyst component of claim 8 wherein the morphology controlling agent employed in Step B is an organosilane, a mono-or polyalkyl-substituted aromatic compound, an o-, m- or p-dialkylphthalate ester or an o-, m- or p-alkyl aralkylphthalate ester.

10. The catalyst or catalyst component of claim 9 wherein the organosilane has a formula of $R_n SiR'_{4-n}$, wherein n is 0 to 4 and wherein R is hydrogen or an alkyl, a haloalkyl or aryl radical containing from 1 to about 10 carbon atoms or a halosilyl radical or haloalkylsilyl radical containing from 1 to about 8 carbon atoms, and R' is OR or a halogen.

11. The catalyst or catalyst component of claim 9 wherein the mono-or polyalkyl-substituted aromatic compound contains from 8 to 10 carbon atoms.

12. The catalyst or catalyst component of claim 2 wherein the aforesaid first temperature employed in Step D is in the range of from about 100° C. to about 125° C.

13. The catalyst or catalyst component of claim 2 wherein the aforesaid second temperature employed in Step D is in the range of from about 50° C. to about 90° C.

14. The catalyst or catalyst component of claim 2 wherein in Step D the treatment at the aforesaid second temperature is at least about 2 hours.

15. The catalyst or catalyst component of claim 2 wherein in Step D the aforesaid second temperature is from about 40 to about 60 degrees below the aforesaid first temperature.

16. The catalyst or catalyst component of claim 2 wherein the particles from Step B are treated in Step D in Substep D-1 with titanium tetrachloride at the aforesaid first temperature, and then in Substep D-2 with titanium tetrachloride in the presence of an electron donor initially at the aforesaid first temperature and then at the aforesaid second temperature.

17. The catalyst or catalyst component of claim 2 wherein the particles from Step B are treated in Step D in Substep D-1 with titanium tetrachloride, then in Substep D-2 with titanium tetrachloride in the presence of an electron donor next in Substep D-3 with a liquid aromatic hydrocarbon and then in Substep D-4 with titanium tetrachloride and wherein Substeps D-1, D-2 and D-3 are performed at the aforesaid first temperature and Substep D-4 is performed initially at the aforesaid first temperature and then at the aforesaid second temperature.

18. The catalyst or catalyst component of claim 2 wherein the solid particles precipitated in Step B are next dissolved and reprecipitated in additional Step C from a cyclic ether and then the reprecipitated particles are treated in Step D with a transition metal compound and an electron donor.

19. The catalyst or catalyst component of claim 18 wherein a morphology control agent is employed in Step B or in Step C prior to the addition of the cyclic ether.

* * * * *